(12) United States Patent
Sato

(10) Patent No.: US 9,001,360 B2
(45) Date of Patent: Apr. 7, 2015

(54) INFORMATION PROCESSING APPARATUS AND INFORMATION PROCESSING METHOD

(75) Inventor: Junji Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 13/555,971

(22) Filed: Jul. 23, 2012

(65) Prior Publication Data
US 2013/0038902 A1 Feb. 14, 2013

(30) Foreign Application Priority Data

Aug. 8, 2011 (JP) ................................. 2011-173279

(51) Int. Cl.
G06F 3/12 (2006.01)
H04N 1/00 (2006.01)
H04N 1/32 (2006.01)

(52) U.S. Cl.
CPC ............ *G06F 3/122* (2013.01); *H04N 1/00244* (2013.01); *H04N 1/32112* (2013.01); *G06F 3/1273* (2013.01); *G06F 3/129* (2013.01); *H04N 2201/3223* (2013.01); *H04N 2201/0039* (2013.01); *H04N 2201/0094* (2013.01); *H04N 2201/3214* (2013.01); *H04N 2201/3215* (2013.01); *H04N 2201/3219* (2013.01); *H04N 2201/3221* (2013.01); *H04N 2201/3202* (2013.01); *H04N 2201/3205* (2013.01); *H04N 2201/3208* (2013.01); *G06F 3/1203* (2013.01)

(58) Field of Classification Search
USPC ............. 358/1.13, 1.14, 1.15, 1.16, 1.9, 3.28, 358/401, 442, 448, 296, 403; 709/223; 399/79, 80
See application file for complete search history.

(56) References Cited

U.S. PATENT DOCUMENTS

| 7,379,950 | B2 | 5/2008 | Sato et al. | |
| 7,559,024 | B2 | 7/2009 | Mori et al. | |
| 8,264,724 | B2 | 9/2012 | Matsuzawa | |
| 2003/0033283 | A1* | 2/2003 | Evans et al. | 707/1 |
| 2005/0243372 | A1 | 11/2005 | Sato et al. | |
| 2006/0268332 | A1* | 11/2006 | Shimada | 358/1.15 |
| 2009/0027726 | A1* | 1/2009 | Kajikawa | 358/1.16 |

(Continued)

FOREIGN PATENT DOCUMENTS

| CN | 101990049 | 3/2011 |
| EP | 1727349 A | 11/2006 |
| EP | 2284686 A | 2/2011 |

(Continued)

OTHER PUBLICATIONS

European Search Report dated Nov. 12, 2012, issued during prosecution of related European Application No. 12179712.0.

(Continued)

*Primary Examiner* — Vu B Hang
(74) *Attorney, Agent, or Firm* — Fitzpatrick, Cella, Harper & Scinto

(57) ABSTRACT

An information processing apparatus, which stores attribute data of a job executed by an image processing apparatus, and reference information of image data associated with the job in a storage device as a job log, saves image data corresponding to reference information in the storage device as cached data. Then, the apparatus acquires image data corresponding to reference information included in a job log from the cached data in the storage device, and outputs a job log appended with the acquired image data to an external system.

8 Claims, 11 Drawing Sheets

(56) References Cited

U.S. PATENT DOCUMENTS

2011/0029572 A1 2/2011 Sato
2011/0267633 A1* 11/2011 Srinivasmurthy K
 et al. .......................... 358/1.13

FOREIGN PATENT DOCUMENTS

| JP | 2006330939 A | 12/2006 |
| JP | 2010-218442 | 9/2010 |
| JP | 2011-34461 | 2/2011 |
| JP | 2011-35675 | 2/2011 |

OTHER PUBLICATIONS

Chinese Office Action dated Aug. 5, 2014 issued during prosecution of related Chinese application No. 201210275711 (whole English Translation included).
Japanese Office Action issued on Jan. 26, 2015 during prosecution of related Japanese application No. 2011-173279.
Korean Office Action issued on Jan. 30, 2015 during prosecution of related Korean application No. 10-2012-0083622.

* cited by examiner

F I G. 4

| JOB TYPE | JOB CLASS | PRESENCE/ABSENCE OF CONTENT DATA IN JOB LOG |
|---|---|---|
| COPY | INPUT JOB | PRESENT |
| SCAN-TO-BOX | INPUT JOB | PRESENT |
| FAX RECEPTION | INPUT JOB | PRESENT |
| FAX SEND | OUTPUT JOB | ABSENT |
| BOX PRINT | OUTPUT JOB | ABSENT |

FIG. 5

JOB ATTRIBUTE DATA

| JOB LOG ID | J0001 |
|---|---|
| JOB TYPE | SCAN-TO-BOX |
| CONTENT ID | C000a |
| JOB EXECUTION TIME | 2010/12/6 15:40:13 |
| JOB EXECUTION USER NAME | Sato |
| LOCATION OF DIGITAL MFP | MEETING ROOM 1 |
| IP ADDRESS OF DIGITAL MFP | 192.168.10.11 |
| ADMINISTRATOR NAME OF DIGITAL MFP | YAMADA |
| JOB EXECUTION RESULT | SUCCESS |
| ... | ... |

CONTENT DATA

| CONTENT ID | C000a |
|---|---|
| IMAGE DATA | ... |

FIG. 6

JOB ATTRIBUTE DATA

| JOB LOG ID | J0002 |
|---|---|
| JOB TYPE | BOX PRINT |
| CONTENT ID | C000a |
| JOB EXECUTION TIME | 2010/12/7 9:21:41 |
| JOB EXECUTION USER NAME | Suzuki |
| LOCATION OF DIGITAL MFP | MEETING ROOM 1 |
| IP ADDRESS OF DIGITAL MFP | 192.168.10.11 |
| ADMINISTRATOR NAME OF DIGITAL MFP | YAMADA |
| JOB EXECUTION RESULT | SUCCESS |
| ... | ... |

F I G. 7
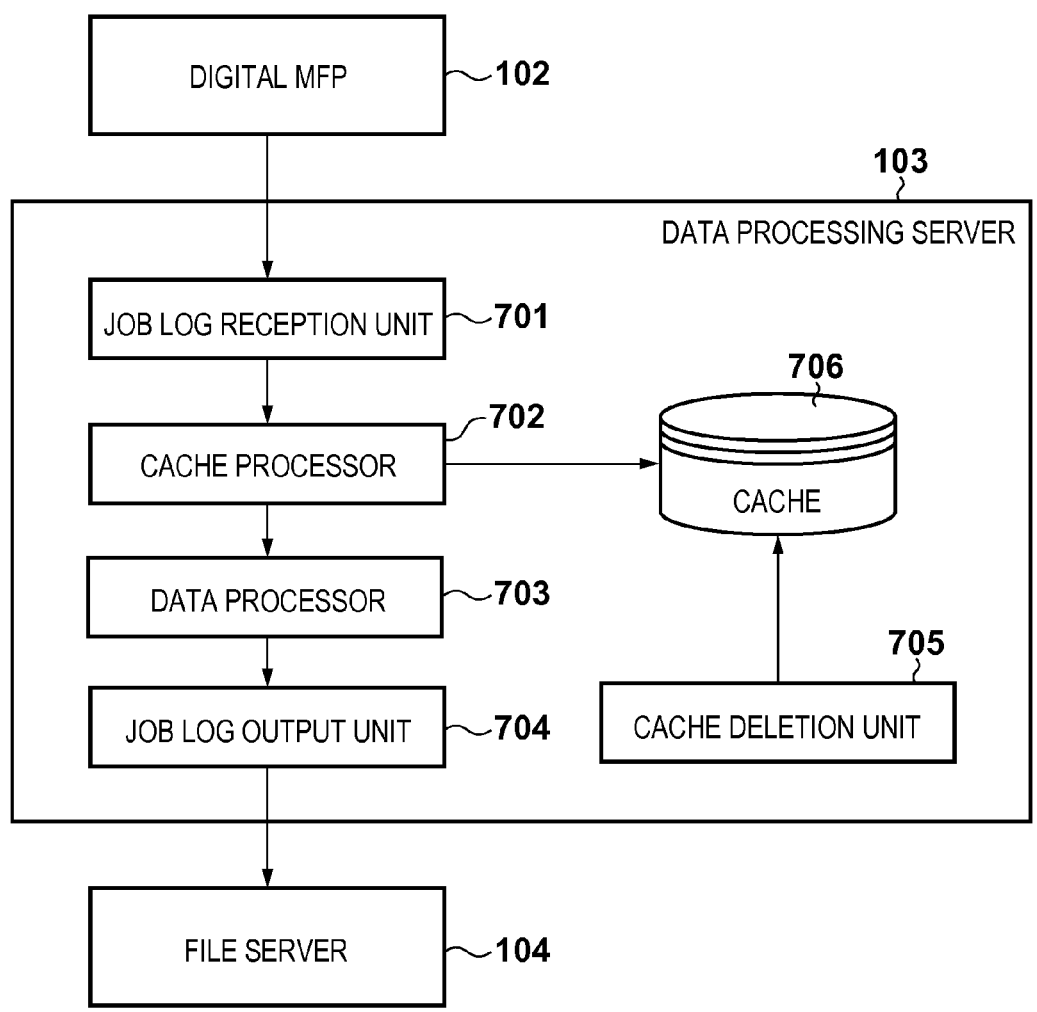

F I G. 9

| JOB TYPE | JOB CLASS | OUTPUT JOB REQUIREMENT COUNT |
|---|---|---|
| COPY | INPUT JOB | 0 |
| SCAN-TO-BOX | INPUT JOB | PLURAL |
| FAX RECEPTION | INPUT JOB | 1 |
| FAX SEND | OUTPUT JOB | |
| BOX PRINT | OUTPUT JOB | |
| ... | ... | ... |

F I G. 10

| CONTENT ID | IMAGE DATA | TEXT DATA | USE COUNT | VALID PERIOD |
|---|---|---|---|---|
| C0000a | ... | ... | 1 | |
| C0000c | ... | ... | PLURAL | DECEMBER 24, 2010 |
| C0000f | ... | ... | PLURAL | DECEMBER 25, 2010 |
| ... | ... | ... | ... | ... |

FIG. 11

JOB ATTRIBUTE DATA

| JOB LOG ID | J0002 |
|---|---|
| JOB TYPE | BOX PRINT |
| CONTENT ID | C000a |
| JOB EXECUTION TIME | 2010/12/7 9:21:41 |
| JOB EXECUTION USER NAME | Suzuki |
| LOCATION OF DIGITAL MFP | MEETING ROOM 1 |
| IP ADDRESS OF DIGITAL MFP | 192.168.10.11 |
| ADMINISTRATOR NAME OF DIGITAL MFP | YAMADA |
| JOB EXECUTION RESULT | SUCCESS |
| ... | ... |

CONTENT DATA

| CONTENT ID | C000a |
|---|---|
| IMAGE DATA | ... |
| TEXT DATA | ... |

INFORMATION PROCESSING APPARATUS AND INFORMATION PROCESSING METHOD

BACKGROUND OF THE INVENTION

1. Field of the Invention

The present invention relates to an information processing apparatus and information processing method, which save information of a job executed by an image processing apparatus as a job log in a storage device.

2. Description of the Related Art

Conventionally, a job log audit system, which acquires pieces of job information of jobs such as a copy job, FAX send/reception job, and print job executed by an image processing apparatus such as a printer, scanner, digital MFP (Multi-Functional Peripheral), or the like, and saves them as job logs in a database, is known. The job log audit system searches the job logs saved in the database to refer to contents of previously executed jobs.

When the user executes, for example, a copy operation using an image processing apparatus, the image processing apparatus generates and accumulates, as a log, job information including a copy execution user name and time, image data and text data of a copied document, and the like. The image processing apparatus transmits the accumulated job logs to a server at a predetermined timing, and the server processes the received job logs and saves them in the database. An auditor conducts a search based on keywords and images with respect to the job logs saved in the database using the job log audit system, thus referring to pieces of log information of jobs executed by the user using the image processing apparatus. Thus, the auditor can audit whether or not the user appropriately uses the image processing apparatus.

Since the job log audit system handles image data each having a large data size, storage capacity poses a problem when the job logs are accumulated in the digital MFP. By contrast, a technique for holding job logs having identical images in the form of link logs which each have only reference information to that image in order to reduce data size is available (Japanese Patent Laid-Open No. 2006-330939).

On the other hand, the aforementioned job logs are often backed up outside the job log audit system or are often used for the purpose of audit in another system.

In the conventional job log audit system, job logs having identical images are accumulated in the database in the form of link logs. For this reason, when data are to be backed up or are to be used in another system, reusability of data has room for improvement (for example, link breaking may have occurred).

SUMMARY OF THE INVENTION

The present invention provides an apparatus and method, which reduce data size of a job log and improve reusability of the saved job log data.

According to one aspect of the present invention, there is provided an information processing apparatus, which stores attribute data of a job executed by an image processing apparatus, and reference information of image data associated with the job in a storage unit as a job log, the apparatus comprising: a saving unit configured to save image data corresponding to the reference information in the storage unit as cached data; an acquisition unit configured to acquire image data corresponding to reference information included in the job log from the cached data in the storage unit; and an output unit configured to output a job log appended with the image data acquired by the acquisition unit.

According to another aspect of the present invention there is provided an information processing method in an information processing apparatus, which stores attribute data of a job executed by an image processing apparatus, and reference information of image data associated with the job in a storage unit as a job log, the method comprising: saving image data corresponding to the reference information in the storage unit as cached data; acquiring image data corresponding to reference information included in the job log from the cached data in the storage unit; and outputting a job log appended with the acquired image data to an external system.

According to still another aspect of the present invention, there is provided a system including an image processing apparatus and an information processing apparatus, which stores a job log of a job executed by the image processing apparatus in a storage unit, wherein the job log, which is received from the image processing apparatus by the information processing apparatus, includes a job log including attribute data of a job and image data associated with the job, and another job log including attribute data of a job and reference information of image data associated with the job, and the information processing apparatus comprises: a saving unit configured to save, in response to the reference information of the other job log, image data included in the job log in the storage unit as cached data; an acquisition unit configured to acquire image data corresponding to reference information included in the other job log from the cached data in the storage unit; and an output unit configured to output another job log appended with the image data acquired by the acquisition unit to an external system.

Further features of the present invention will become apparent from the following description of exemplary embodiments (with reference to the attached drawings).

BRIEF DESCRIPTION OF THE DRAWINGS

FIG. 4 is a table showing an example of various jobs executed by the digital MFP 102;

FIG. 5 shows the data configuration of a job log of an input job;

FIG. 6 shows the data configuration of a job log of an output job;

FIG. 7 is a schematic block diagram showing the arrangement of functional components of a data processing server 103;

FIG. 9 is a table showing an example of job definitions of the cache processor 702;

FIG. 10 is a table showing an example of content data saved in a cache 706;

FIG. 11 shows the data configuration of a job log saved in a file server 104;

DESCRIPTION OF THE EMBODIMENTS

Figure 1:
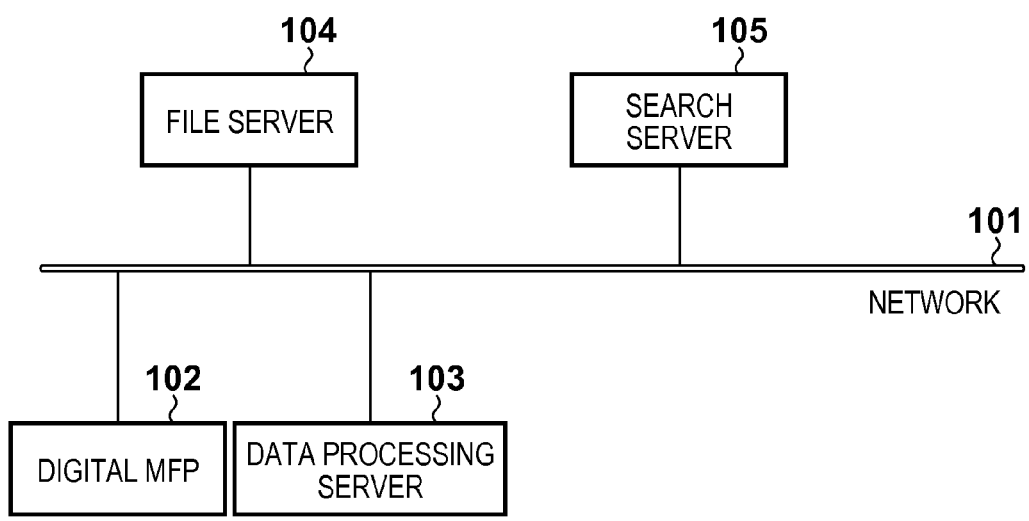
FIG. 1 is a block diagram showing an example of the arrangement of a job log audit system.

Embodiments for carrying out the present invention will be described in detail hereinafter with reference to the drawings.

These embodiments will exemplify a digital MFP having a plurality of functions such as a copy function, scan function, print function, and FAX function as an image processing apparatus.

First Embodiment

An example of the arrangement of a job log audit system as a system which collects, for example, job logs for the purpose of audit of job logs according to the first embodiment will be described below using the block diagram shown in FIG. 1. The job log audit system includes various servers such as a data processing server 103, file server 104, and search server 105, and a digital MFP 102, which are connected to each other via a network 101. The network 101 includes a LAN which is managed in an office or a WAN which is extensively managed over the Internet. Note that each of the various servers may include an information processing apparatus such as a personal computer (PC).

The digital MFP 102 has various job execution functions such as scan, print, copy, e-mail, and FAX job execution functions. The digital MFP 102 has a storage area for saving document data in itself, and has functions of printing saved document data, sending the document data as an e-mail message, and sending the document data as FAX data. In this embodiment, that storage area will be referred to as a "user box" hereinafter. The digital MFP 102 has a function of recording job logs in association with various jobs executed on itself, and of transmitting the job logs to the data processing server 103. Note that a job log includes job execution user information, job execution date and time information, job attribute data such as an executed job type, and job content data such as image data and text data processed by a job.

The data processing server 103 applies data conversion processing to the job logs received from the digital MFP 102, and saves the processed job logs in the file server 104. Note that the data conversion processing is processing for shaping the contents of job attribute data included in a job log, applying OCR processing to image data of job content data to extract text data, and converting the format and size of the image data. The data processing server 103 has a function of temporarily holding content data as cached data, and uses the cached content data upon saving a job log in the file server 104.

The file server 104 saves the job log processed by the data processing server 103. The file server 104 needs only be a storage device which can save job logs, and for example, a relational database may be used.

The search server 105 is an application which searches job logs saved in the file server 104 using predetermined conditions, and presents the search result to the user. The user audits job logs saved in the file server 104 using the search server 105. Note that the present invention is applicable to any types of search servers 105 as long as they are applications which refer to job logs saved in the file server 104. Also, the search server 105 may be an application server of an external system which is not included in the job log audit system. Furthermore, the search server 105 may be a data mining system which analyzes large quantities of job logs and uses them in decision making. Moreover, the search server 105 may be a file management system which fetches job logs saved in the file server 104 and manages job logs based on strict security policies. In addition, the search server 105 may be a system which periodically backs up files in the file server 104.

FIG. 1 includes one data processing server 103, one file server 104, and one search server 105. Alternatively, a plurality of components of each type may be included for the sake of redundancy and performance improvement. A certain component and another component may be arranged in a single server. For example, the data processing server 103 and file server 104 may be arranged on a single server.

Figure 2:
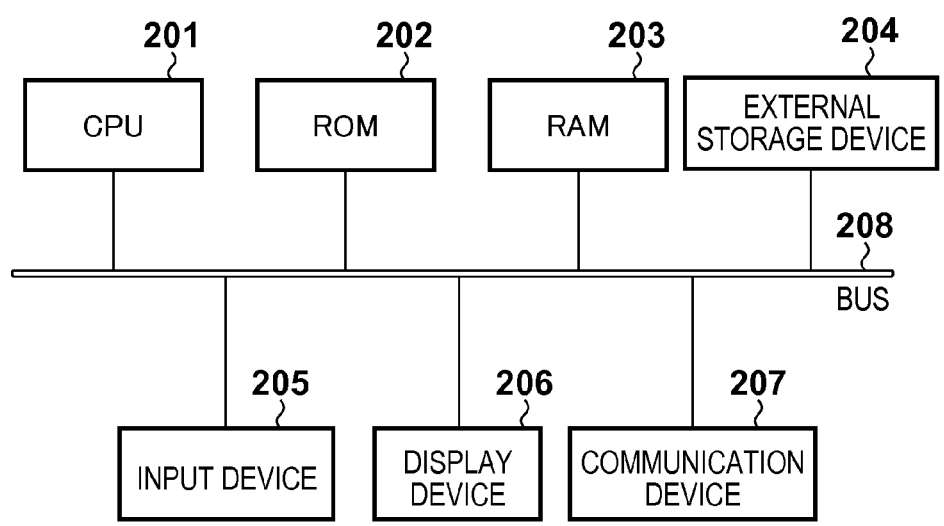
FIG. 2 is a block diagram showing an example of the hardware arrangement of a server.

An example of the hardware arrangement of a server in the job log audit system will be described below using the block diagram shown in FIG. 2. Referring to FIG. 2, a CPU 201 executes various kinds of data processing associated with acquisition of job logs and arithmetic processing required for a search, and controls respective components connected to a bus 208. A ROM 202 is a read only memory which stores a basic control program and control data. A RAM 203 is a random access memory used for various kinds of arithmetic processing of the CPU 201 and to temporarily store data. An external storage device 204 stores a system program such as an OS (Operating System) of the information processing and a program of the job log audit system, and is used as a temporary storage area during data processing. The external storage device 204 has a lower data input/output speed than the RAM 203, but it can hold large-capacity data. The external storage device 204 mainly includes a magnetic storage device (HDD), but it may be a device which loads external media such as a CD, DVD, and memory card, and which reads and records data.

An input device 205 is used to input characters and data to the information processing apparatus, and corresponds to various keyboards and mouses. A display device 206 is used to display a processing result of the information processing apparatus, and corresponds to a CRT or liquid crystal monitor. A communication device 207 establishes connection to the LAN to make data communications based on TCP/IP, and is used to communicate with other information processing apparatuses.

Figure 3:
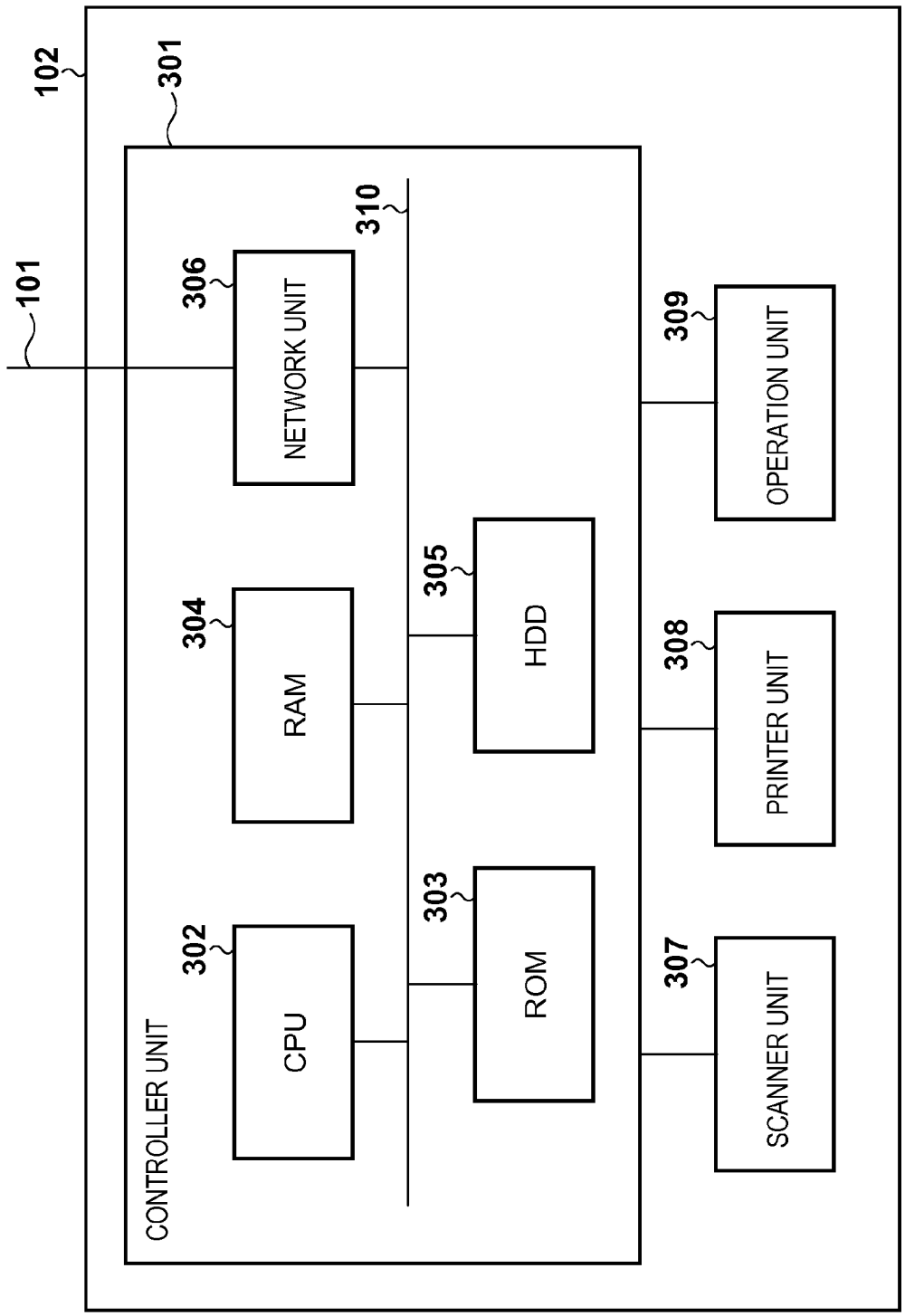
FIG. 3 is a block diagram showing an example of the arrangement of a digital MFP 102.

An example of the arrangement of the digital MFP 102 in the job log audit system will be described below using the block diagram shown in FIG. 3. A controller unit 301 is connected to a scanner unit 307 as an image input device, a printer unit 308 as an image output device, and an operation unit 309 as a digital MFP operation device. On the other hand, the controller unit 301 is connected to the network 101 via a network unit 306.

In the controller unit 301, a CPU 302 is a processor which controls the overall system. A ROM 303 stores a boot program required to launch the system and the like. A RAM 304 is a system work memory required for the CPU 302 to operate, and is also a buffer memory used to temporarily store input image data. A hard disk drive (HDD) 305 stores system software and job logs. A partial area of the HDD 305 is used as a user box area used to store document data. The network unit 306 establishes connection to the network 101, and exchanges document data, job logs, information related to the digital MFP, and the like with other devices on the network. The aforementioned units are arranged on the system bus 310.

The operation unit 309 outputs information related to the digital MFP 102 and that which allows the user to operate the digital MFP 102 on a screen. The operation unit 309 assumes a role of accepting an input from an operator, and transferring that information to the controller unit 301.

An example of various jobs executed by the digital MFP 102 will be described below using FIG. 4. As shown in FIG. 4, jobs are managed using a job class indicating an input or output job, and an item indicating the presence/absence of content data in a job log. In this case, an input job is a job, document data of which is externally input upon execution of the job by the digital MFP 102.

For example, a copy job is an input job which instructs to process document data of an original document scanned by the scanner unit 307 and to print the processed data by the printer unit 308. A scan-to-BOX job is an input job which instructs to store document data of an original document scanned by the scanner unit 307 in the user box area in the HDD 305. When the digital MFP 102 executes an input job, it records job attribute data and job content data as a job log. To input document data, the digital MFP 102 assigns a content identifier (content ID) required to uniquely identify job content data in itself.

An output job instructs to process document data which is processed as an input job and is held in the digital MFP 102. For example, a BOX print job instructs the printer unit 308 to print document data stored in the user box area in the HDD 305. In this case, document data used in an output job is the same as that which was previously processed by an arbitrary input job. For this reason, an output job and corresponding input job have the same content ID included in job logs.

The data configuration of a job log generated by the digital MFP 102 upon execution of an input job will be described below using FIG. 5. As a job log of an input job, job attribute data and content data are generated. The job attribute data includes information such as a job log ID, job type, content ID, and job execution user name. The content data includes a content ID and image data.

The job log ID is an identifier used to uniquely identify a job log. The content ID is an identifier used to uniquely identify content data. In case of jobs which handle the same document data, their job logs include the same content ID.

The data configuration of a job log generated by the digital MFP 102 upon execution of an output job will be described below using FIG. 6. As a job log of an output job, only job attribute data is generated, and no content data is generated. Document data used in an output job is the same as that used in a previously processed input job, and the contents of document data used in the output job can be confirmed with reference to a job log of the input job which includes the same content ID. In the example shown in FIG. 6, a content ID is "C000a", which is the same as that in the job log of the input job shown in FIG. 5. Hence, when content data related to the job log shown in FIG. 6 is to be referred to, the content data of the job log shown in FIG. 5 has to be referred to. Reference is made using reference information which is represented here by the content ID as an example.

That is, the job log of the output data shown in FIG. 6 does not have any content data, but it has reference information (content ID) to content data included in the job log of the input job shown in FIG. 5. A job log which has reference information to content data of another jog log in this way will be referred to as a link log hereinafter.

The schematic arrangement of functional components required to control the information processing apparatus to serve as the data processing server 103 will be described below using FIG. 7. As shown in FIG. 7, functional components required to implement processing of a job log include a job log reception unit 701, cache processor 702, data processor 703, and job log output unit 704. Also, a functional component, which manages a cache, includes a cache deletion unit 705. The aforementioned functional components are software modules which run on the data processing server 103.

The job log reception unit 701 receives a job log transmitted from the digital MFP 102.

The cache processor 702 saves content data in a cache 706 and acquires content data from the cache 706 based on the contents of the job log received by the job log reception unit 701. Upon saving content data in the cache, a cache use count and valid period are set based on the contents of the job log. The cache valid period can be set in advance by an administrator of the job log audit system. Upon acquiring content data from the cache, deletion processing is executed based on the set cache use count.

The data processor 703 applies data processing to a job log. The data processing corresponds to resolution conversion processing, data compression processing, data format conversion processing, and the like.

Figure 8:
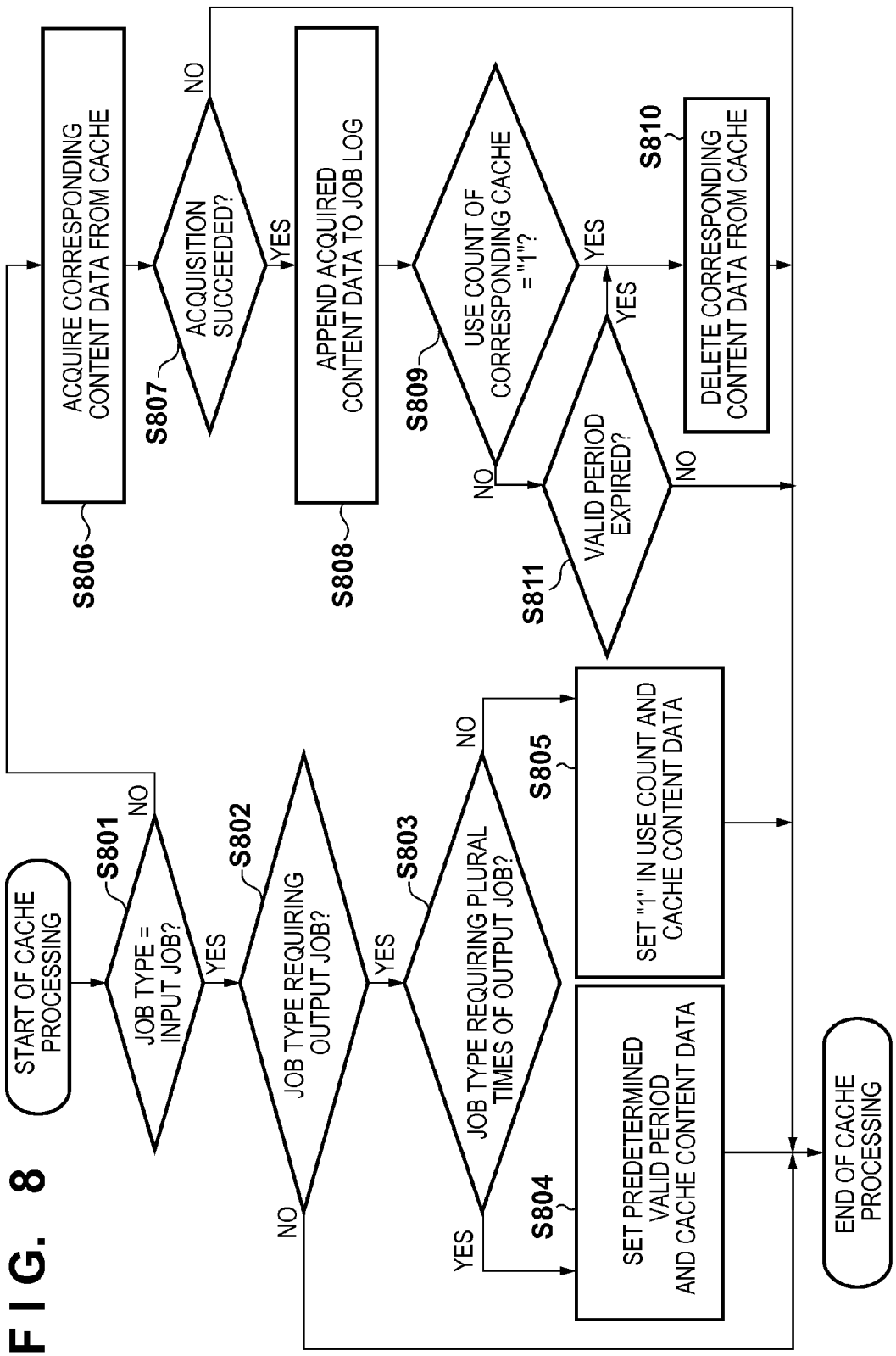
FIG. 8 is a flowchart showing the operation of a cache processor 702.

The job log output unit 704 outputs a job log to the file server 104 as an external system after processing (to be described later; FIG. 8) by the cache processor 702. A job log to be output undergoes the data processing by the data processor 703. As for an output timing, a job log may be output in response to a user's export instruction or according to a pre-set schedule.

The cache deletion unit 705 deletes content data which is saved in the cache 706 and the valid period of which has expired. An execution timing of the deletion processing by the cache deletion unit 705 can be set in advance by the administrator of the job log audit system. The deletion processing is executed every day at, for example, 12 midnight.

The operation of the cache processor 702 will be described below using the flowchart shown in FIG. 8.

The cache processor 702 determines in step S801 whether or not a job type of a job log to be processed is an "input job". As a result of determination, if the job type is an "input job", the process advances to step S802, and the cache processor 702 determines whether or not the job type requires an output job. In this case, if the job type does not require any output job, the cache processor 702 skips cache saving processing, and ends this processing.

If it is determined in step S802 above that the job type requires an output job, the process advances to step S803, and the cache processor 702 determines whether or not the job type requires a plurality of times of an output job. If the determination result is YES, the process advances to step S804, and since the job type requires a plurality of times of an output job, the cache processor 702 sets a predetermined valid period, and then saves content data in the cache. On the other hand, if the determination result is NO in step S803, the process advances to step S805, and since the job type requires an output job only once, the cache processor 702 sets "1" in a cache use count, and saves content data in the cache. If the determination result is YES in step S801, the job log output unit 704 outputs the job log including both the job attribute data and the content data to the file server.

If it is determined in step S801 above that the job type is "output job", the process advances to step S806, and the cache processor 702 executes cache acquisition processing and cache deletion processing in processes up to step S810. In step S806, the cache processor 702 acquires content data from the cache using a content ID as a key. The cache processor 702 determines in step S807 whether or not the content data of that content ID can be acquired from the cache. If the content data of that content ID cannot be acquired from the cache, the cache processor 702 ends the cache processing. If content data acquisition has failed, the job log output unit 704 outputs the job log without any content data to the file server.

If content data acquisition has succeeded in step S807 above, the process advances to step S808, and the cache processor 702 copies the acquired content data as that of the job log to be processed. With this processing, the job log which is a link log is output by the job log output unit 704 to the file server while being appended with the content data.

The cache processor 702 determines in step S809 whether or not the cache use count of that content ID is "1". If the cache use count is "1", the process advances to step S810, and the cache processor 702 deletes the content data of that content ID from the cache.

On the other hand, if the cache use count of that content ID is not "1", the process advances to step S811, and the cache processor 702 determines whether or not a valid period was set, and has expired. If the valid period has not expired yet, the cache processor 702 ends the cache processing without deleting the cache data from the cache. However, if the valid period has expired, the cache processor 702 deletes the content data of that content ID from the cache.

An example of job definitions of the cache processor 702 will be described below using FIG. 9. Note that the job definitions are referred to by the cache processor 702 in the cache processing, and define, for all job types, a class indicating an input or output job, and a possible output job requirement count in case of an input job. Also, these job definitions are prescribed, and are not freely changed by a system administrator.

In the example shown in FIG. 9, "copy", "scan-to-BOX", and "FAX reception" are defined as input jobs, and "FAX send" and "BOX print" are defined as output jobs.

As for "copy" of the input jobs, since document data to be copied is not saved in the digital MFP 102, there is no possibility of generation of an output job using that document data later. For this reason, a link log generation count is "0", and the cache processor 702 does not create any cache data. As for "scan-to-BOX", scanned document data is saved in the user box area of the digital MFP 102, and the saved data may be printed or sent as FAX data later. For this reason, a plurality of link logs may be generated, and the cache processor 702 sets a predetermined valid period and creates cache data.

On the other hand, in case of an output job, a link log is never generated later. Since a job log itself of an output job does not include any content data, the cache processor 702 acquires content data from the cache using a content ID as a key.

An example of content data saved in the cache 706 will be described below using FIG. 10. In FIG. 10, the cache processor 702 sets a use count and valid period for each of the content data saved in the cache. For example, when a link log including a content ID=C0000a is generated, the cache processor 702 acquires content data having the content ID=C0000a from the cache. In this case, since the cache use count of the content data having the content ID=C0000a is "1", the cache processor 702 deletes that content data from the cache simultaneously with acquisition of the content data.

On the other hand, a cache use count of content data having a content ID=C0000c is "plural", and a valid period thereof is "Dec. 24, 2010". When a link log including a content ID=C0000c is generated before Dec. 24, 2010, the cache processor 702 acquires image data and text data having the content ID=C0000c from the cache, but it does not delete them from the cache at that time. These cache data are deleted when the cache deletion unit 705 executes deletion processing at a predetermined timing after Dec. 24, 2010.

The data configuration of the job log when the job log shown in FIG. 6 is saved in the file server 104 will be described below using FIG. 11. Note that FIGS. 6 and 11 are substantially the same except that the jog log includes content data.

More specifically, the job type of the job log shown in FIG. 11 is "BOX print", and is a link log. Hence, the job log at the creation timing by the digital MFP 102 does not include any content data, as shown in FIG. 6. By contrast, in FIG. 11, the job log which is processed by the data processing server 103 and is saved in the file server 104 has content data since the cache processor 702 has acquired that content data from the cache 706.

In FIG. 11, the job log has text data compared to FIG. 5. This text data is generated since the data processor 703 in the data processing server 103 executes OCR processing to the image data.

Second Embodiment

The second embodiment according to the present invention will be described in detail below with reference to the drawings. In the first embodiment, the data processing server 103 executes the cache processing and cache deletion processing. However, in the second embodiment, the file server 104 executes cache processing and cache deletion processing. Note that other arrangements are the same as those in the first embodiment. Hence, the same reference numerals denote the same components as in the first embodiment, and a description thereof will not be repeated. Only differences from the first embodiment will be described below.

Figure 12:
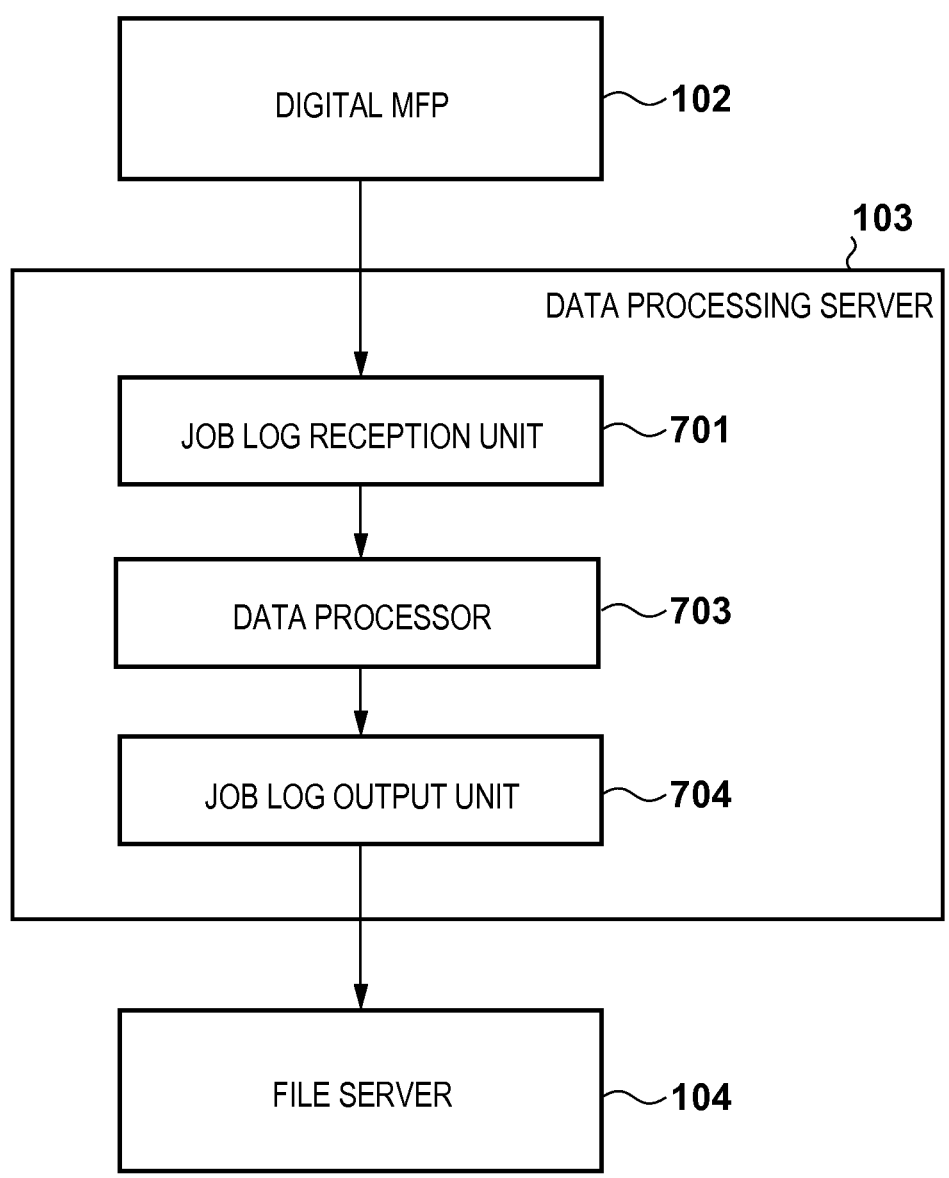
FIG. 12 is a schematic block diagram showing the arrangement of functional components of the data processing server 103.

FIG. 12 is a schematic block diagram showing the arrangement of functional components of the data processing server 103. The same reference numerals denote the same components as in FIG. 7, and a description thereof will not be repeated. As shown in FIG. 12, in the second embodiment, the data processing server 103 does not include any cache 706. For this reason, the data processing server 103 applies data processing to a job log received from the digital MFP 102, and transmits the processed log to the file server 104.

Figure 13:
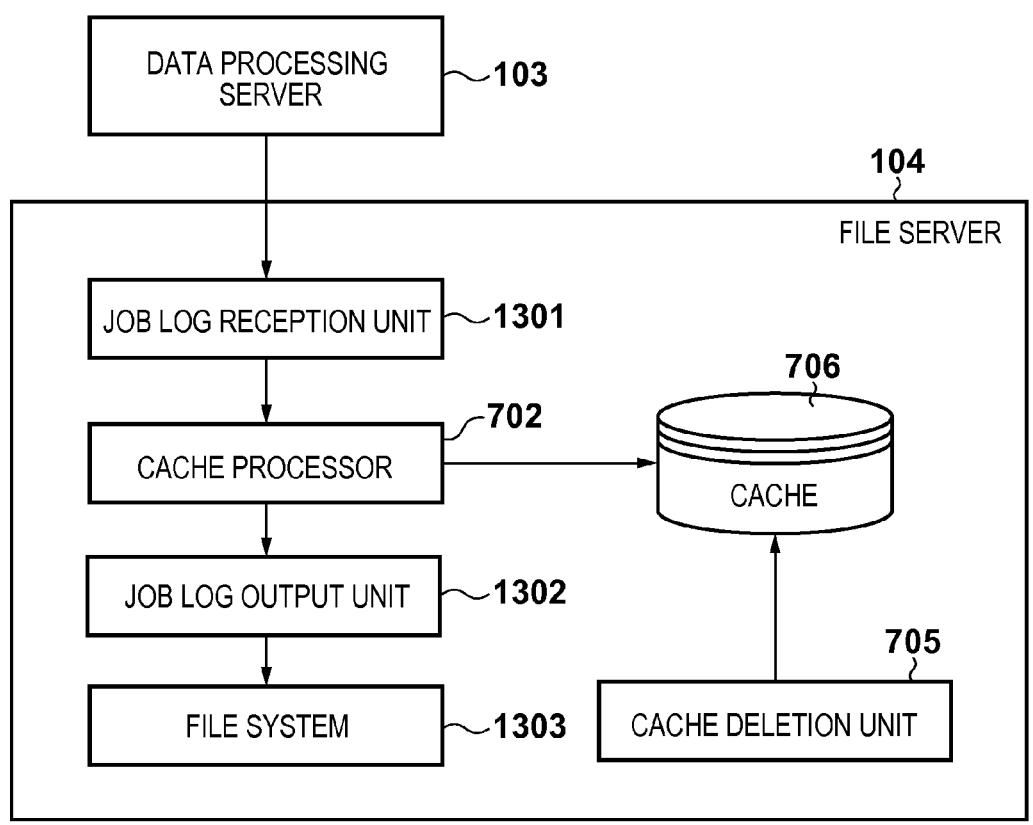
FIG. 13 is a schematic block diagram showing the arrangement of functional components of the file server 104.

FIG. 13 is a schematic block diagram showing the arrangement of functional components of the file server 104. The same reference numerals denote the same components as in FIG. 7, and a description thereof will not be repeated. As shown in FIG. 13, in the second embodiment, the cache 706 is processed on the file server in place of the data processing server 103.

A job log reception unit 1301 receives a job log from the data processing server 103. A job log output unit 1302 outputs a job log to a file system 1303 built on the external storage device 204 on the file server 104 to save the log in the file system 103. Note that the cache processor 702 executes the cache processing in the same manner as in the flowchart shown in FIG. 8.

According to the second embodiment, since the file server 104 executes the cache processing in place of the data processing server 103, the cache can be uniformly managed even in the system arrangement which distributes a load to a plurality of data processing servers 103. Thus, even in the system arrangement which distributes a load to the plurality of data processing servers, audit processing efficiency and data reusability of accumulated job logs can be efficiently improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-173279, filed Aug. 8, 2011, which is hereby incorporated by reference herein in its entirety.

What is claimed is:

1. An information processing apparatus, which processes job logs corresponding to jobs executed by an image processing apparatus, said information processing apparatus comprising:
a reception unit configured to receive a job log corresponding to a job executed by the image processing apparatus;
a saving unit configured to save, when attribute data of a first job log received by the reception unit indicates an input job, image data included in the first job log as cached data corresponding to reference information of image data associated with the job;
an output unit configured to output a job log received by the reception unit to an external system; and
an acquisition unit configured to acquire, when attribute data of a second job log received by the reception unit does not indicate the input job but indicates an output job, image data corresponding to reference information included in the second job log from the cached data,
wherein the saving unit is configured to save the image data included in the first job log as the cached data before the first job log is output to the external system by the output unit,
wherein the output unit is configured to output the second job log, the image data acquired by the acquisition unit being appended with the second job log, and
wherein said input job is a job by which the image processing apparatus acquires data for one or more subsequent output jobs.

2. The apparatus according to claim 1, wherein when the saving unit saves the image data as the cached data, the saving unit is configured to set a use count of the cached data.

3. The apparatus according to claim 2, wherein the saving unit is configured to refer to the attribute data of the job log received by the reception unit, and
when the job log is a log of an input job having a corresponding plurality of output jobs, and when saving the image data as the cached data, the saving unit is configured to set "plural" as the use count of the cached data.

4. The apparatus according to claim 2, further comprising a deletion unit configured to delete the saved cached data based on the setting of the use count.

5. An information processing method in an information processing apparatus, which processes job logs corresponding to jobs executed by an image processing apparatus, the method comprising:
receiving a job log corresponding to a job executed by the image processing apparatus;
saving, when attribute data of a first job log received in the receiving step indicates an input job, image data included in the first job log as cached data corresponding to reference information of image data associated with the job;
outputting a job log received in the receiving step to an external system; and
acquiring, when attribute data of a second job log received in the receiving step does not indicate the input job but indicates an output job, image data corresponding to reference information included in the second job log from the cached data,
wherein the saving step saves image data included in the first job log as the cached data before the first job log is output to the external system by the outputting step,
wherein the outputting step outputs the second job log, the image data acquired by the acquiring step being appended with the with the second job log, and
wherein said input job is a job by which the image processing apparatus acquires data for one or more subsequent output jobs.

6. A system including an image processing apparatus and an information processing apparatus which processes job logs corresponding to jobs executed by the image processing apparatus,
wherein the information processing apparatus comprises:
a reception unit configured to receive a job log corresponding to a job executed by the image processing apparatus;
a saving unit configured to save, when attribute data of a first job log received by the reception unit indicates an input job, image data included in the first job log as cached data corresponding to reference information of image data associated with the job;
an output unit configured to output a job log received by the reception unit to an external system; and
an acquisition unit configured to acquire, when attribute data of a second job log received by the reception unit does not indicate the input job but indicates an output job, image data corresponding to reference information included in the second job log from the cached data,
wherein the saving unit is configured to save image data included in the first job log as the cached data before the first job log is output to the external system by the output unit,
wherein the output unit is configured to output the second job log, the image data acquired by the acquisition unit being appended with the second job log, and
wherein said input job is a job by which the image processing apparatus acquires data for one or more subsequent output jobs.

7. A non-transitory computer-readable recording medium on which is recorded code of a program for controlling a computer to execute an information processing method of claim 5.

8. The apparatus according to claim 3, wherein, when the job log is a log of an input job having a single corresponding output job, and when saving the image data as the cached data, the saving unit is configured to set "1" as the use count of the cached data.

* * * * *